(12) United States Patent
Hsu

(10) Patent No.: US 7,343,051 B1
(45) Date of Patent: Mar. 11, 2008

(54) METHOD OF RECOGNIZING AN OBJECT IN AN IMAGE USING MULTI-SENSOR INTEGRATION THROUGH CONDITIONALLY OPTIMAL GEOSCENE GENERATION AND REGISTRATION

(76) Inventor: Shin-yi Hsu, 2312 Hemlock La., Vestal, NY (US) 13850

( * ) Notice: Subject to any disclaimer, the term of this patent is extended or adjusted under 35 U.S.C. 154(b) by 303 days.

(21) Appl. No.: 11/074,245

(22) Filed: Mar. 7, 2005

(51) Int. Cl.
*G06K 9/32* (2006.01)
*G06K 9/36* (2006.01)

(52) U.S. Cl. ..................... 382/294; 382/284
(58) Field of Classification Search .............. 382/284, 382/113, 201, 394
See application file for complete search history.

(56) References Cited

U.S. PATENT DOCUMENTS

| | | | | |
|---|---|---|---|---|
| 2,199,499 | A * | 5/1940 | Kreitler .................. | 273/273 |
| 4,347,618 | A * | 8/1982 | Kavouras et al. ........... | 375/259 |
| 5,596,500 | A * | 1/1997 | Sprague et al. ............ | 701/213 |
| 6,694,064 | B1 * | 2/2004 | Benkelman ................ | 382/284 |
| 2004/0008866 | A1 * | 1/2004 | Rhoads et al. .............. | 382/100 |
| 2005/0177307 | A1 * | 8/2005 | Greenfeld et al. .......... | 701/220 |

OTHER PUBLICATIONS

The Universal Transverse Mercator (UTM) Grid, USGS, Aug. 2001, http:llerg.usgs.govlisblpubslfactsheetslfsO7701.html.*

Digital Orthophoto Quarter Quad Distribution, MSGIC, Apr. 19, 2000, www.msgic.state.md.us/techtool/doqqdist/qdoqqdis.htm.*

* cited by examiner

*Primary Examiner*—Joseph Mancuso
*Assistant Examiner*—Randolph Chu
(74) *Attorney, Agent, or Firm*—Mark Levy & Associates, PLLC

(57) ABSTRACT

A method of recognizing an object in an image using multi-sensor integration through conditionally optimal geoscene generation and registration is provided. At least two images, one of which is a conditionally optimum, ortho-rectified base image, are input and used to generate a geoscene using at least two ground control points in a latitude-longitude geospatial domain. Georegistration of the geoscene produces a registered geoimage which may be output. A virtual geospatial information system database may be compiled from the georegistered images. A virtual transverse Mercator (VTM) projection is defined which allows processing images falling on both sides of the equator or across traditional UTM boundaries. An Affine transform is used for coordinate transformation in generating geoscenes. The georegistration process utilizes the union and the intersection of image pixels, and geolayering with interacting layers including geogrids and text layers, to define main body and background pixels to facilitate object recognition.

47 Claims, 13 Drawing Sheets
(12 of 13 Drawing Sheet(s) Filed in Color)

METHOD OF RECOGNIZING AN OBJECT IN AN IMAGE USING MULTI-SENSOR INTEGRATION THROUGH CONDITIONALLY OPTIMAL GEOSCENE GENERATION AND REGISTRATION

RELATED APPLICATIONS

The present invention is related to copending U.S. patent application Ser. Nos. 10/412,954 filed Apr. 15, 2003, and Ser. No. 10/623,089 filed Jul. 18, 2003, and to U.S. patent application Ser. No. 08/066,691, filed May 21, 1993, now issued as U.S. Pat. No. 5,631,970, all of which are included herein in their entirety by reference.

FIELD OF THE INVENTION

The present invention relates to object recognition in an image and, more particularly to recognition of an object in an image by generating, registering, and measuring geoscenes to integrate multi-sensor images.

BACKGROUND OF THE INVENTION

In pattern recognition and remote sensing, object recognition is typically performed by gradually accumulating evidences from various sensors and components within individual sensors. The first approach is usually referred to as intra-sensor integration, whereas the latter is referred to as inter-sensor integration. Information extraction from multi-sensor images is usually a more difficult procedure than is information extraction from a single sensor image simply because multi-sensor images are almost never spatially registered. Thus, the first step to multi-sensor integration is typically to physically register the images as completely as possible.

Multi-sensor coverage of an area can be illustrated, for purposes of discussion, using the New River Inlet Quadrangle of North Carolina. The imagery of the finest resolution is Digital Orthophoto Quad (DOQ) or Digital Orthophoto Quarter Quad (DOQQ) imagery generated by the United States Geological Survey (USGS). DOQ or DOQQ imagery has a spatial resolution level of approximately one meter/pixel. Another image type similar to DOQ imagery is called controlled image base 5 meter (CIB-5) which typically has a spatial resolution level of approximately 5 meters/pixel. Both DOQ and CIB-5 images are referred to as ortho-rectified or orthoimages because a constant scale pertains over the entire image surface.

The IKONOS-2 satellite was launched in September 1999 and has been delivering commercial data since early 2000. IKONOS is the first of a new generation of high spatial resolution satellites. IKONOS data records four channels of multispectral data at 4 meter resolution and one panchromatic channel at 1 meter resolution. This means that IKONOS is the first commercial satellite to deliver near photographic, high resolution satellite imagery of terrain anywhere in the world. IKONOS data is collected as 11 bits per pixel (2048 gray tones). Bands, wavelengths, and resolutions of the IKONOS data are:

| Panchromatic | 0.45–0.90 µm | 1 meter |
|---|---|---|
| Band 1 | 0.45–0.53 µm (blue) | 4 meters |
| Band 2 | 0.52–0.61 µm (green) | 4 meters |
| Band 3 | 0.64–0.72 µm (red) | 4 meters |
| Band 4 | 0.77–0.88 µm (near infra-red) | 4 meters |

The spatial resolution of the IKONOS imagery of the New River Inlet area is between about 1.1 meter/pixel and 1.4 meter/pixel. It has been determined that resolution of the pixels along the x-axis is different from the pixel resolution along the y-axis in the IKONOS imagery. That means that these pixels are rectangular, not square.

Coarser-resolution satellite imagery for the test area in addition to IKONOS includes SPOT pan with a resolution of about approximately 10 m/pixel, and LANDSAT™ (enhanced thermic mapper) a resolution level of about 30 m/pixel. Like IKONOS imagery, the SPOT pan and LANDSAT imagery of the test site both also contain rectangular pixels.

In image processing and remote sensing analyses, it is generally assumed that the shape of the pixels in the imagery under investigation is square. However, for the above-noted test site, only DOQ and CIB-5 have square pixels; the rest of the images have rectangular pixels. Since IKONOS, SPOT and LANDSAT images are much more popular than are DOQ and CIB-5 images, it is unthinkable that most remote sensing researchers the world over have assumed these satellite images have square pixels. In reality these square pixels have never existed in most circumstances since 1972 when the first LANDSAT was launched.

When the first LANDSAT was launched, (originally called Earth Resources Technological Satellite (ERTS)), its multispectral scanner (MSS) imagery had a spatial resolution of about 80 meters/pixel. With an orbiting altitude of about 500 miles and a spatial resolution of 80 meters, there was little concern about whether the ERTS pixels were square or rectangular.

With the introduction of DOQ in the 1990s, however, square pixels at the resolution level of one meter/pixel were available. Not much later, IKONOS imagery became available. It was generally believed that IKONOS imagery had a spatial resolution of 1 meter/pixel in the panchromatic domain, and 4 meters/pixel in the multispectral domain. For the most part, image users have not considered the reality of the shape of the pixels of the IKONOS imagery. Most people observing the images assume that a "square-pixel" is the norm, and that DOQ can provide such pixels. The existence of non-square pixels among dissimilar imagery types, however, is one of the critical reasons why mismatching exists among multi-sensor images. In other words, the first step in multi-sensor integration is to understand the causes and effects of non-square pixels over the entire image surface.

Spatial mismatch among multispectral images may result from dissimilarities in their resolution levels, their location or translation, their depression angles, their orientations, and combinations of these factors. Conventional methods of image registration include ortho-rectification and a number of image warping approaches (for example, nearest neighbor and rubber sheeting methods) as well as variations of these methods. Such methods are known to those of skill in the art.

An ortho-rectified image has a constant scale over the entire image surface, both vertically and horizontally, as if it were a map. Thus, when all the input images are ortho-rectified, each of them has a constant scale, and each column of the image is oriented toward the north. Under these conditions, multi-sensor image registration becomes an easy task, that of changing the scale of one image to match the scale of the other image. In addition, a common pixel must be located in each image which becomes the very NW corner pixel in each image. The problem of using ortho-rectification as a means of image registration stems from the fact that ortho-rectification by itself is a very complex process. Consequently, in many cases, it cannot be assumed that ortho-rectified imagery is a natural product of any particular sensing system.

From the most commonly-used image processing software, such as Earth Resources Data Analysis System (ERDAS) and the Environment for Visualization Images (ENVI), one can conclude that conventional image registration approaches are centered on manually locating a few control points in the to-be-registered imagery, and then selecting one of the methods provided by the software package used to perform image registration. (*ENVY User Guide*, Research System, Inc. 1996 Edition, pp. 10-1 to 10.16).

In its simplest form, image registration begins with matching the selected control points (i.e., pixels). Once the control point pixels are relocated to match the identical control points in another image, all the rest of the pixels must somehow be moved to create one or more new images. The rules by which the pixels in each image to be registered are moved in this context constitute an image registration algorithm. While computational procedures for image registration are computerized, the steps that the image analyst must follow are usually both time-consuming and tedious. Another drawback that an image analyst usually encounters is that the spectral values of the original scenes may become altered after image registration.

A comparative analysis between ortho-rectification and conventional image registration methods provided by commonly used image processing software reveals that the superiority of ortho-rectification lies in its ability to generalize over a very large geographic region. Conventional approaches using manually-selected control points at a localized region, on the other hand, are usually not generalizable beyond the area covered by the selected control points. This also means that in order to cover a large geographic area with repetitive actions of control point section, the conventional image registration process is very labor intensive. While ortho-rectification is capable of generalizing over a very large geographic region for image registration, the process of ortho-rectification itself is so complex that it usually requires a thorough understanding of the camera model and, in addition, generally requires having digital elevation models of the terrain of the image. Without having the camera model and digital elevation data of the imaged area, ortho-rectification cannot easily and effectively be performed.

While distinct objects on images from different sources, having different scales, depression angles, and/or orientations, possess identical geospatial (i.e., latitude and longitude or "lat-long") coordinates, geospatial information is not heavily utilized by conventional image registration approaches. On a flat map, one of the most commonly used counterparts of the lat-long system is the map-based Universal Transverse Mercator (UTM) projection that denotes a particular location using "easting" (in meters) and "northing" (in meters) plus a zone ID. Each UTM zone is defined by 6 degrees in Easting and 8 degrees in Northing. One degree represents about 110,000 meters.

This zone ID-based UTM system works well for point locations since one point location can be easily identified within one particular UTM zone. In an image that covers a large geographic area, the image pixels may fall into two different UTM zones. A case in point is the city of Culpepper, Va., which falls into two UTM zones. That is, East Culpepper DOQQ belongs to UTM zone 18, whereas West Culpepper DOQQ belongs to UTM zone 17. Since the central meridian for UTM zone 17 is different from the central meridian of zone 18, there is a mismatch between the West Culpepper DOQ and the East Culpepper DOQ at the junction of these two DOQs. This mismatch occurs in center of the city of Culpepper, Va.

FIG. 1 clearly shows the mismatch pattern at the junction of two UTM zones. As may readily be seen, one easily-seen feature appears twice, once in each of the UTM zones. Such an occurrence indicates a severe mismatch, at least in the upper region of the images.

In this cross-zone scenario (FIG. 1), the mathematics used for the conventional UTM system may be inadequate to deal with the pixels in one image, which spans two UTM zones. Similarly, UTM has difficulty dealing with image pixels that are dispersed into both north side and south side of the equator.

Therefore, it is advantageous to define a way to measure the degree to which a given scene departs from an ortho-photo setting. In an ortho-rectified scene, it is necessary only to know one control point and to have the resolution of the pixel in order to determine the distance from a particular pixel location to another pixel location.

It is also advantageous to convert a given scene into a geoscene so that a distinct object in multiple images can possess the same geo-locational values, and the distance between two pixels or ground objects can be measured in terms of the earth's coordinate system, rather than in pixels. Similar methods may be used to quantify areas in images (i.e., to geomeasuring). In the method of the present invention, a pixel in a geoscene has quadruple representations:

(1) (x,y) coordinates in the image domain;
(2) UTM representation in the geospatial domain;
(3) latitude-longitude in the geospatial domain; and
(4) VTM representation in the geospatial domain.

As UTM is a map-based representation of latitude and longitude (lat-long) readings. Conversion between lat-long and the UTM system may be obtained using the methods outlined in Wolf and Ghilani: *Elementary Surveying: An Introduction To Geomatics*. (Prentice Hall, 2002). Using the geoscene in accordance with the present invention, pixel (x,y) readings may be converted to UTM or the lat-long equivalent freely in both directions. This means that the distance between two pixels in the geoscene may be measured in terms of the physical distance in meters, on the ground.

Since image pixels may be distributed over multiple UTM zones and/or over both the north and south sides of the equator, it is advantageous to develop a modified UTM system by which the central meridian may be adjusted according to the spatial locations of the pixels instead of fixed locations. Also, the northing readings may be calculated across the equator in a continuous fashion. In the present invention, this is referred to as a Virtual Transverse Mercator (VTM) projection.

It is also advantageous to measure the resolution of a pixel in an image in terms of both x and y axes, or easting and northing in the context of both the UTM and the VTM systems. In the ortho-photo case, the x-resolution equals the y-resolution. In non-ortho-photo cases, however, the x-resolution does not equal the y-resolution.

It is advantageous to determine whether using only the x-resolution and the y-resolution information of two images is adequate to perform scene registration.

It is also advantageous to measure the degree of mismatch that still exists between two scenes by using two control points after the condition of rectangular, non-square pixels are accommodated.

Since the use of rectangular pixels cannot account for all the factors affecting mismatch between two scenes, it is advantageous to develop a method by which two general scenes can be registered by using multiple (e.g., four) control points.

It is equally advantageous to develop an image registration method by which the spectral values of the pixels in the original inputs are not altered after registration. This is important because the spectral signature of a given object is based on the original spectral values of the pixel representing that object. Any deviation from the original spectral value may create errors in subsequent object recognition.

It is also advantageous to develop a new image registration method by which, after image registration, the spectral value of a given pixel at a given image location or geo-location will not be influenced by the spectral value of any neighboring pixel.

It is definitely advantageous to perform a near-perfect ortho-rectification for image registration without having to use a camera model of the sensor and/or the digital elevation data of the imaged area.

It is also advantageous to perform both image registration and image mosaicking simultaneously when multiple images align correctly in the geospatial domain.

It is additionally advantageous to project both the intersecting and unioned sections of the geospatially aligned images and/or pixels into a map domain, such as UTM or VTM.

It is also advantageous to overlay a geoimage with geo-features and/or geo-objects. This process is called geooverlaying.

It is further advantageous to overlay geoimages with text to identify relative and/or absolute geolocations on the image.

It is also advantageous to perform measurements within geoimages to obtain accurate object measurements in one-, two-, and three-dimensional spaces.

With a newly created image, be it from georegistration or from a geomosaicking process, it is advantageous to apply a set of geospatially based grid lines disposed at predetermined geospatial units, for example, 500 meters, 1000 meters, etc. Text to indicate either relative or absolute geolocations of the image surface may be included. This process is called geogriding.

It is also advantageous to apply a set of reference lines (i.e., geogriding) using rectangular patterns, circular patterns, or lines arranged in other geometric patterns.

SUMMARY OF THE INVENTION

In accordance with the invention, there is provided a method of recognizing an object in an image using multi-sensor integration through conditionally optimal geo-scene generation and registration. At least two images, one of which is typically a conditionally optimum, ortho-rectified base image, are used to generate a geoscene. The geoscene generation is performed using at least two ground control points in a latitude-longitude ("lat-long") geospatial domain. An Affine transform may be used for coordinate transformation in the geoscene generation process. The geoscene is georegistered to produce a registered geoimage which may be output. The union and the intersection of image pixels are used to define main body and background pixels. A virtual geospatial information system database may be compiled from the georegistered images.

A virtual transverse Mercator (VTM) projection is defined to help process images falling on either or both sides of the equator or across traditional UTM boundaries.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1:
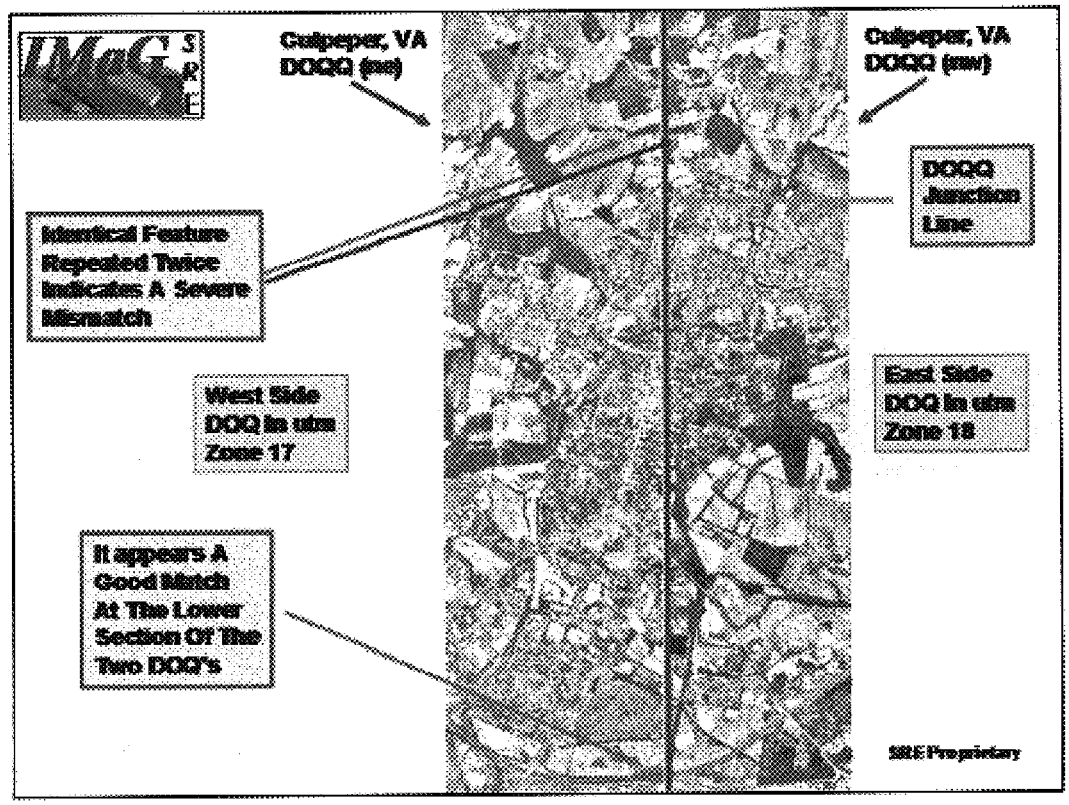
FIG. 1 is pair of satellite images of adjoining DOQQs showing spatial mismatch therebetween at a junction of two different UTM zones.

The method of the present invention begins with generating geoscenes using four different models. A geoscene is defined in terms of an image in which every pixel is denoted by four locational identification systems:

a) (x,y) coordinates in the image domain;

b) UTM or VTM coordinates in the map projection domain;

c) decimal degree in the geospatial domain; and d) degrees, minutes and seconds in the geospatial domain.

Several tools exist to perform conversions between or among various coordinate systems. First, a bi-directional method for conversion between lat-long and UTM is required. Basic methods for two-way lat-long to UTM conversions are provided in Wolf and Ghilani in *Elementary Surveying: An Introduction to Geomatics* (New York: Prentice Hall, 2002). However, a superior method of performing such conversions is provided by the present invention.

In the UTM system, the geographic location of each zone is fixed. Consequently, the central meridian at the center of each UTM zone has a fixed location. In accordance with the present invention, however, the location of each VTM zone is movable. The width and height of a VTM zone may be the same as those of a UTM zone. In other words, by moving a 6-by-8 square degree area, all the pixels of the images to be registered are then moved so as to be included within one particular VTM zone. This means that for all the pixels within the VTM zone, there will be only one central meridian for orientation designation. The local central meridian may be determined by the distribution of the locations of the pixels under investigation. The specification for the location meridian is as follows:

For a particular VTM zone to exist, all the locations of the pixels covered by the images to be registered are geolocated. From the min and max lat-long readings of the locations of the pixels, the local central meridian is determined; from that central meridian, a particular VTM zone is generated. Thus, the specifications for the local VTM meridian are as follows:

a) the local meridian is the mean of all locations of the pixels under investigation; and b) the local central meridian is designated by an integer (i.e., a whole, rounded number), for example 77 degrees.

Another difference between UTM and VTM is that in the UTM system, the distance designation in the longitude direction is divided into northern hemisphere and southern hemisphere, independently. Because each hemisphere starts at 0 and ends at 10 million meters, the UTM system cannot handle images having pixels dispersed over both north and south of the equator. In the VTM specification, both the northern hemisphere and the southern hemisphere are treated as one contiguous entity. Mathematically speaking, locations in the northern hemisphere are treated as positive numbers, while locations in the southern hemisphere as treated as negative numbers. Therefore, a third VTM specification is:

c) longitude readings in the northern hemisphere range from 0 to 10 million meters; and longitude readings in the southern hemisphere range from 0 to negative 10 million meters.

The mathematics that form the basis of the novel VTM system may be obtained from Wolf and Ghilani described hereinabove and are provided as Appendix A attached hereto.

To transform between two coordinate systems, the Affine transform is used. The mathematics for the Affine transform appears in Appendix B.

Four models for geoscene generation are used as part of the novel method of the present invention. Each model utilizes a different set of assumptions.

For geoscene generation, it is assumed that a conditionally optimal base image (COBI) exists, and other scenes are to be registered onto the COBI. A high resolution orthophoto with known geo-coordinates for a few pixels known as the ground control point (GCP) is an example of a COBI.

To generate a geoscene, an executable script that contains four sets of arguments is used:

Program Name –in infile_name –out outfile_name – ref "utm coordinate@x,y) –ref "utm coordinates@x,y) –ref "utm coordinate@x,y) –ref "utm coordinate@x,y)  (1)

/* –ref twice for two control points */

/* –ref four times for four control points */

From Equation (1), out_file is a geoscene. The number of –ref controls how many ground control points are used to generate the geoscene.

In addition, the ground control points must have both geo-coordinate readings, and visually distinct features for manual pointing.

Five models for georegistration are identified.

Model 1: Both COBI and To-be-Matched Scenes are Orthophotos

Georegistration Model 1 assumes that both the base image and the to-be-registered images are ortho-rectified. In this case, only two ground control points are required.

Model 2: COBI is Orthophoto and To-be-Matched Images are Oblique

In Model 2, the requirements for the to-be-matched images are relaxed; they can be non-orthophotos. However, the number of required control points is still only two. The goal of this model is to detect the degree of the obliqueness of the to-be-matched scene.

Model 3: COBI is Orthophoto and To-be-Matched Images are Oblique

The difference between Model 2 and Model 3 is that Model 3 uses three or more control points, whereas the number of control points is restricted to two for Model 2. It should be noted, however, that under the Affine transform, two, three, four or more control points may be used. The solution of the four-control-point system is generally better than a solution generated by systems using fewer control points.

Model 4: COBI is Still Ortho-Rectified and To-be-Matched Images are Oblique

In general, for Model 3, the resolution levels of the COBI and the to-be-matched images are close. For Model 4 the resolution level of to-be-matched scenes is much coarser than the resolution level of the COBI. For example, the resolution of the COBI is one meter/pixel, whereas the to-be-matched images may have a resolution of 10 meter/pixel or coarser. For each new stage of matching analysis, the user must supply a new set of control points. In Model 4, the number of control points is typically three or four and the number of matching stages is two.

Model 5: Both the COBI and To-be-Matched Images are Oblique

Model 5 is essentially an extension of Model 4 by assuming the COBI to be an oblique photo. However, among all the input images, the COBI has better geospatial control. The number of control points, however, is three or more and the number of stages for matching is two or more.

From the foregoing, it may be understood that when using either Model 4 or Model 5, the end product of georegistration has the same resolution. The x-scale and, the y-scale of the pixel, and the orientation of the matched images are almost identical to those characteristics of the COBI. Therefore, if the COBI is an orthophoto, the matched images become near orthophoto in image quality. In other words, the inventive georegistration methodology is in reality a means to generate near-orthophoto images without having to possess the camera models of the sensors and digital elevation model (DEM) of the image coverage area. Technically, the inventive ortho-rectification approach requires that the COBI be an orthophoto to begin with. Since this condition may not always exist, the inventive georegistration process is conditionally optimal orthophoto generation (COOG).

The novel COOG method of geoscene generation and georegistration of images from multiple sensors discussed above may be implemented using text-based scripts as well as interactive systems having corresponding graphic user interfaces (GUIs). Both implementations are described hereinbelow. In addition, it will be recognized that the method of the invention may be implemented in firmware using either graphical or text-based user interfaces In the GUI-based georegistration system, multiple image viewers or windows are provided. In each image viewer, basic image visualization functions, such as zooming, roaming, scale change, pixel intensity change/modification, scene-based gamma functions, etc. are provided to facilitate the selection of ground control points. One GUI-based implementation of the method of the present invention is the IMaG™ system which is used herein for purposes of disclosure. With GUI-based georegistration systems (e.g., IMaG), once the control points are manually or semi-automatically selected, geoscene generation and georegistration are then automatically executed.

In the process of georegistration, the union of the geoimages used to create the georegistrated scenes is a geomosaic. Therefore, a geomosaic is a useful by-product of the georegistration process.

An overlay may be applied to any generic geoimage, for example, an individual image, a georegistered image or a geomosaic. Such an overlay is called a geooverlay and the process of applying a geooverlay is called geooverlaying.

One possible geooverlay is a set of grid lines on the image, the grid lines typically corresponding to either a UTM or VTM system. This overlay is called a geogrid. Like any geooverlay, a geogrid may be considered a geospatial feature of the overlaid image. The process of overlaying a geogrid is called geogridding. It will be recognized that while geogrid implies a rectangular lattice of reference lines, other geometric patterns, for example a series of concentric circles or other geographic shapes overlaid on a geoimage may also be useful in analyzing and measuring objects and/or areas in geoimages. Consequently, the terms geogrid and geogridding apply to any such overlaid pattern.

The method of the present invention provides a Virtual Geospacial Information System (VGIS) having a database of geospacial information contained therein. First, a spatial structure to identify any image generated for any region of the world is created. Each created spatial unit is identified by a unique, standard designation so information about any identified region may be readily located. For example, a search engine (e.g., Google®) may easily locate information available via the Internet from anywhere in the world.

In the UTM system, each defined UTM zone is composed of a region of 6-by-8 degrees. This size is too large to define practical geospatial information items since one degree is equivalent to about 110,000 meters, and each UTM zone is therefore about 660,000 meters by 880,000 meters. This is equivalent to 660,000 by 880,000 pixels, assuming the resolution of the image is 1 m/pixel.

The resolution of currently available, commercial satellite imagery is already under 1 m/pixel. In order to conform to the existing remote sensing environment, the method of the present invention uses spatial units for a virtual geodatabase covering an area of 7.5 minutes by 7.5 minutes. This, incidentally, is the same area as a topographic quadrangle produced by the United States Geological Survey (USGS). Thus, one degree has 8 quads in a linear scale. Globally, there are 2880 geo-quads, computed as follows:

$$8 \text{ quads} \times 360 = 2880 \text{ quads} \quad (2)$$

Unlike the UTM system, the inventive VGIS also has 2880 quads defined along the northing direction. Therefore, by using a four-digit system, the first quad can be designated as $$0001\_0001 \quad (3)$$

And the ID of the last quad is:

$$2880\_2880 \quad (4)$$

Each geoquad may be subdivided into four quarter quads (QQ). Each quarter quad can be designated by either a numeric ID or a text ID code as follows.

The numeric ID code is:

_00 for the SW QQ;

_50 for the SE QQ;

_05 for the NW QQ; and

_55 for the NE QQ. (5)

Figure 3:
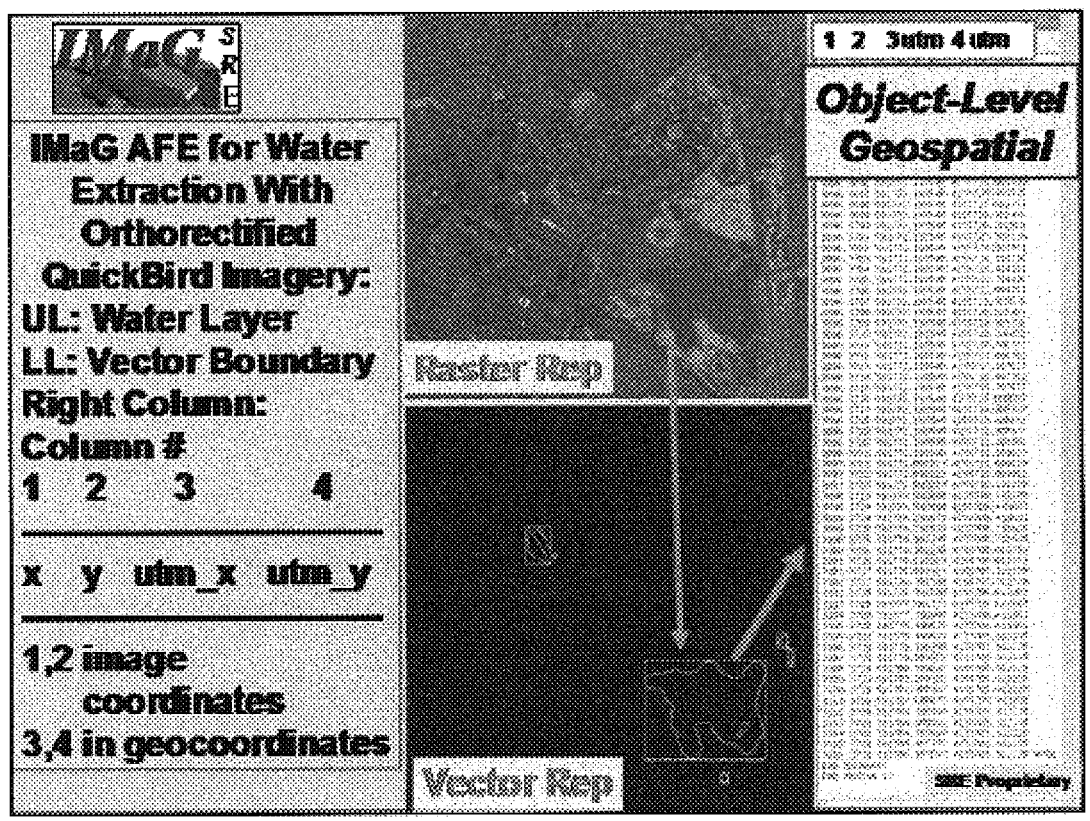
FIG. 3 is a diagram showing dual raster and vector representations of an object.

This VGIS structure (i.e., quads and quarter-quads) may be represented graphically as shown in FIG. 3.

As discussed hereinabove, the result of georegistration is a set of images all having the same resolution, the same orientation, and the same dimension. This set of images is identical to a multispectral image cube. If four or more images are available in the image cube, 20 or more additional images may be generated using linear and non-linear combinations of the at least four input images. These additional generated images are called n-transforms.

From a multispectral image cube containing the original images and their resultant n-transforms, an object spectral signature library may be generated. For example, if the object is a particular ground vehicle, a spectral signature of the ground vehicle may be generated by clicking on (i.e., selecting) one pixel of that particular ground vehicle. If the first image is denoted m_1, the second image m_2, and the $n^{th}$ image is m_n. The location of a particular selected pixel located at (i,j) has a pixel value of x_1 at (i,j)=$y^1$, a pixel value of x_2 at (i,j)=$y^2$, and finally, a pixel value of x_n at (i,j)=$y^n$, the following vector may be generated:

$$[y^1, y^2, \ldots, y^n] \quad (6)$$

Equation (6) represents the spectral signature of the ground vehicle. A spectral signature library is composed of the spectral signatures of multiple objects.

An object layer is essentially a two-tone image in which one of the tone categories is an object and the other is the object's background. Usually, the object pixels are coded as white or graytone with a value of 255, and the background is back or a graytone with a value of zero. However, if the object-layer image is converted into a geoscene, then the object layer is in the geospatial domain.

An object layer represents an object in terms of a set of contiguous pixels. An object boundary file represents the same object in terms of a set of boundary pixels, leaving the interior as "blank" or identical to the background pixels. If the boundary file's image (x,y) is converted into corresponding geospatial coordinates, the object boundary file is in both the image domain and the geospatial domain as shown in FIG. 3.

The object layer may have multiple object regions. The IMaG system provides an object attribute table to describe the characteristics of each region. The table is called a feature attribute table (FAT), a typical FAT being shown in FIG. 4, generally at reference number 300.

Figure 4:
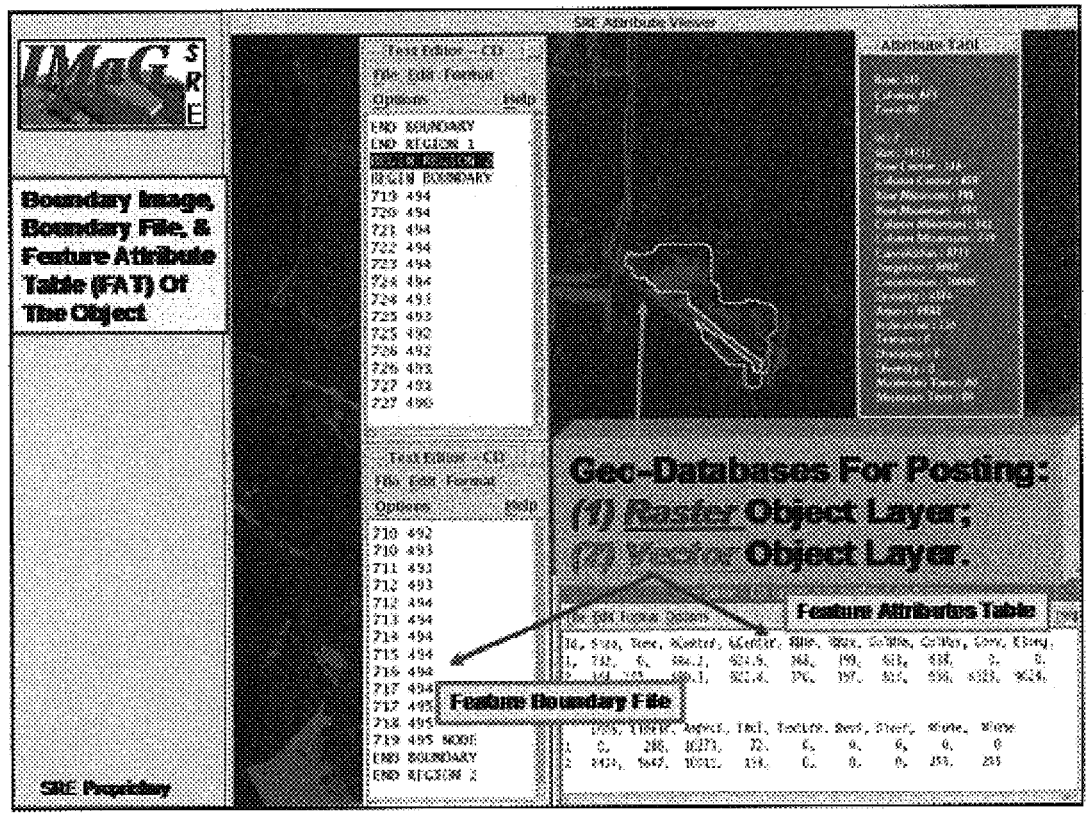
FIG. 4 is a vector representation of a boundary and feature attribute table.
Figure 5:
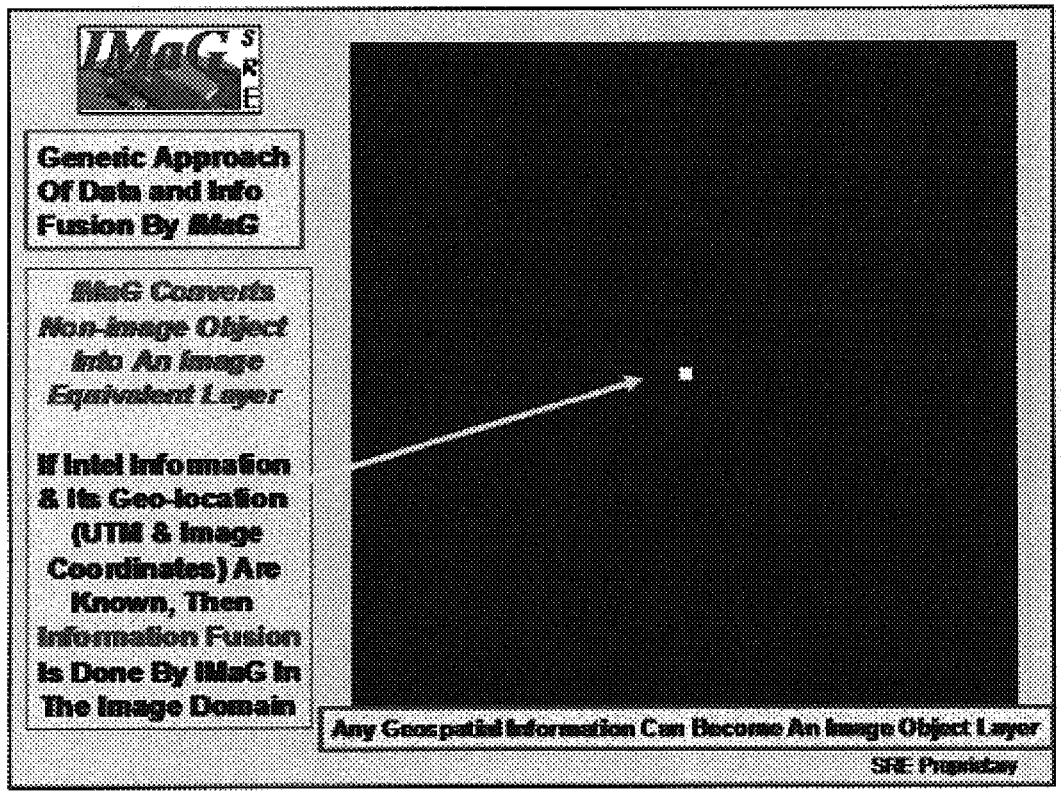
FIG. 5 is an illustration of the process of representing a signal as a point object in a geoimage.
Figure 6:
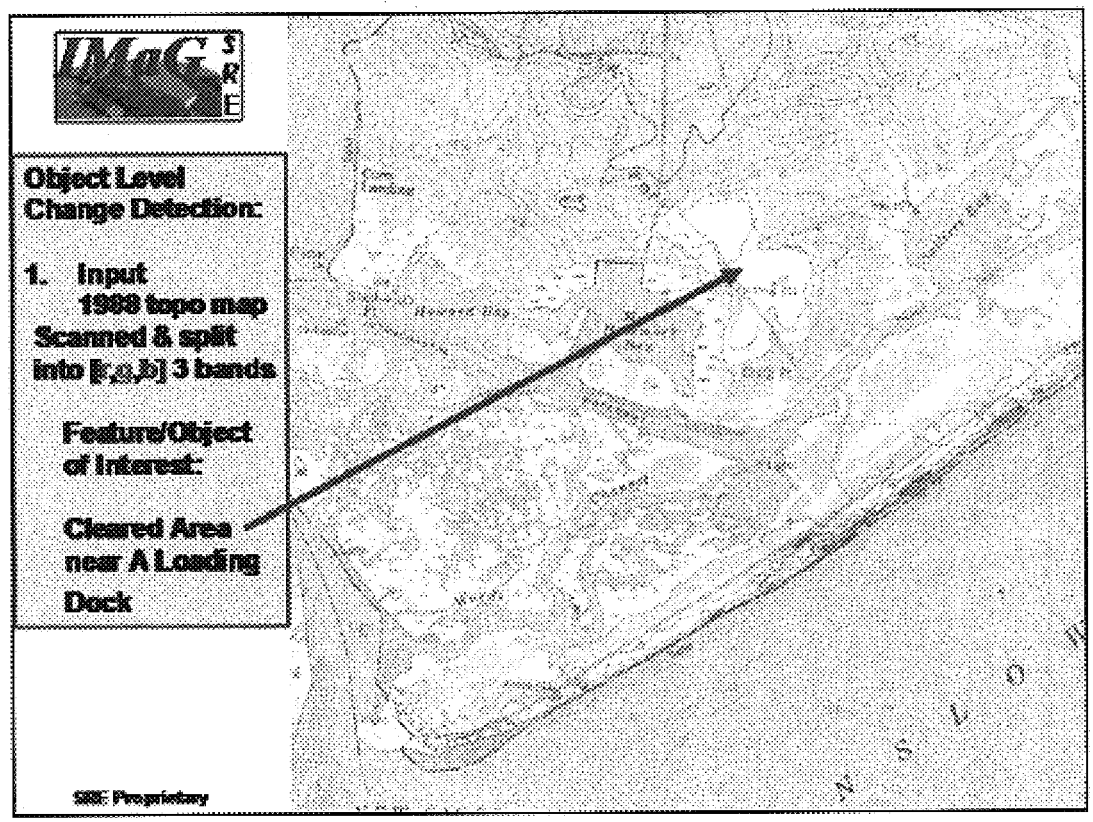
FIG. 6 is a 1988 USGS topoquad map of New River Inlet, N.C.
Figure 7:
FIG. 7 is a 1988 USGS DOQQ map of New River Inlet, N.C.
Figure 8:
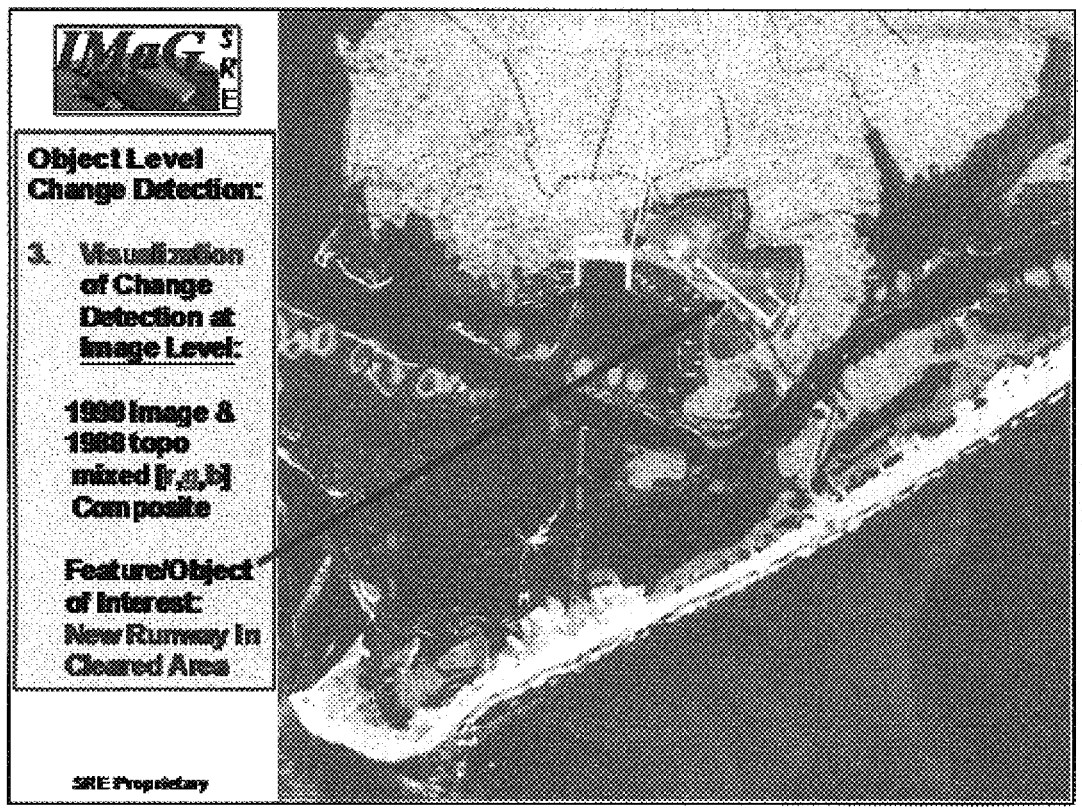
FIG. 8 is a composite scene formed by the map of FIG. 7 and an image, for identifying a feature.
Figure 9:
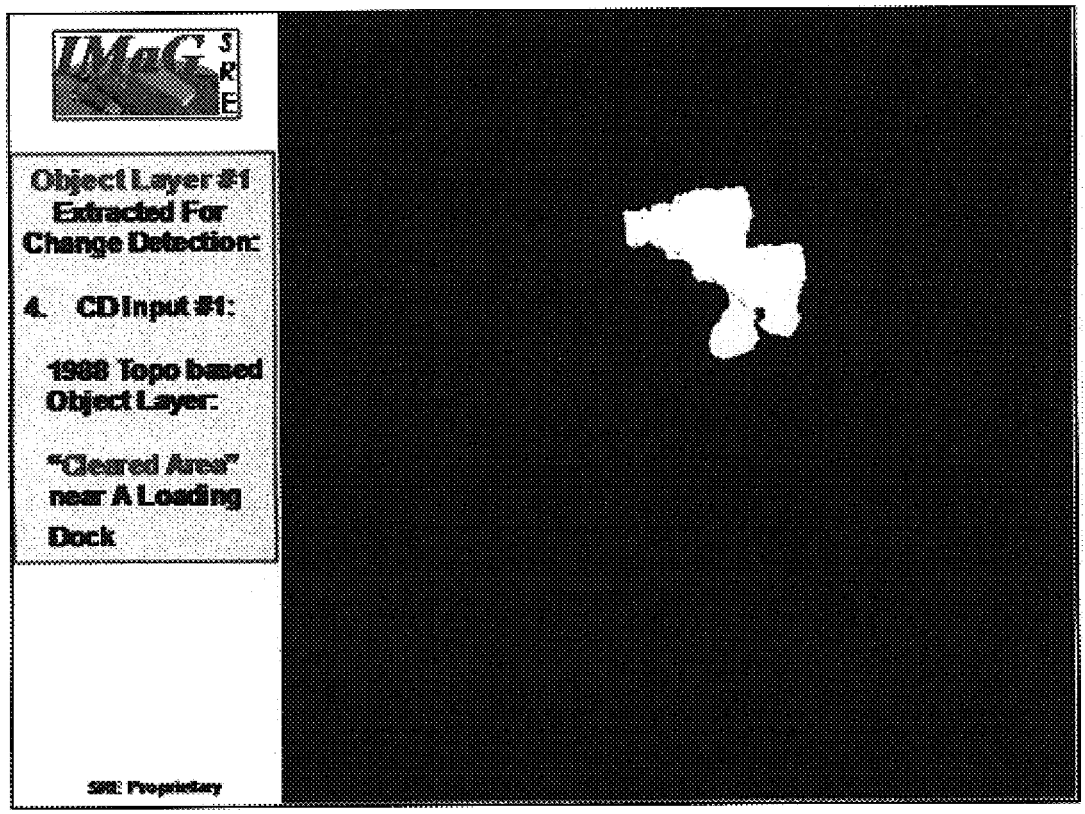
FIG. 9 shows a cleared area feature extracted from the composite scene of FIG. 8.
Figure 10:
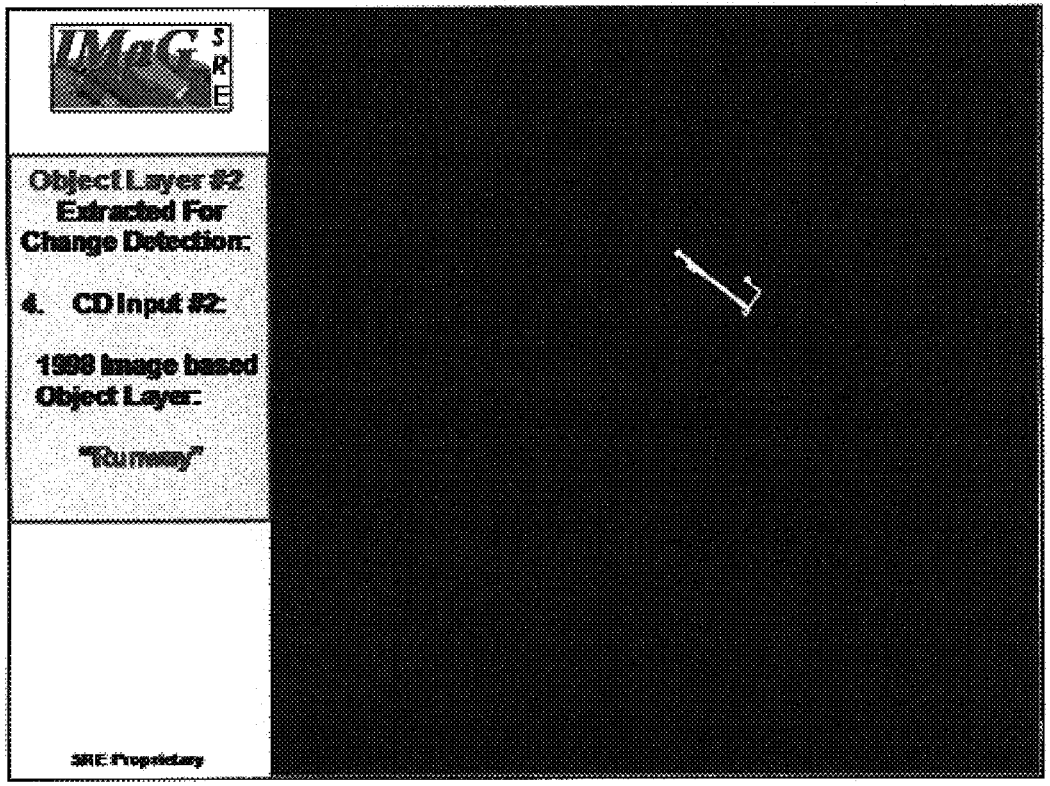
FIG. 10 shows a runway feature extracted from the composite scene of FIG. 8.
Figure 11:
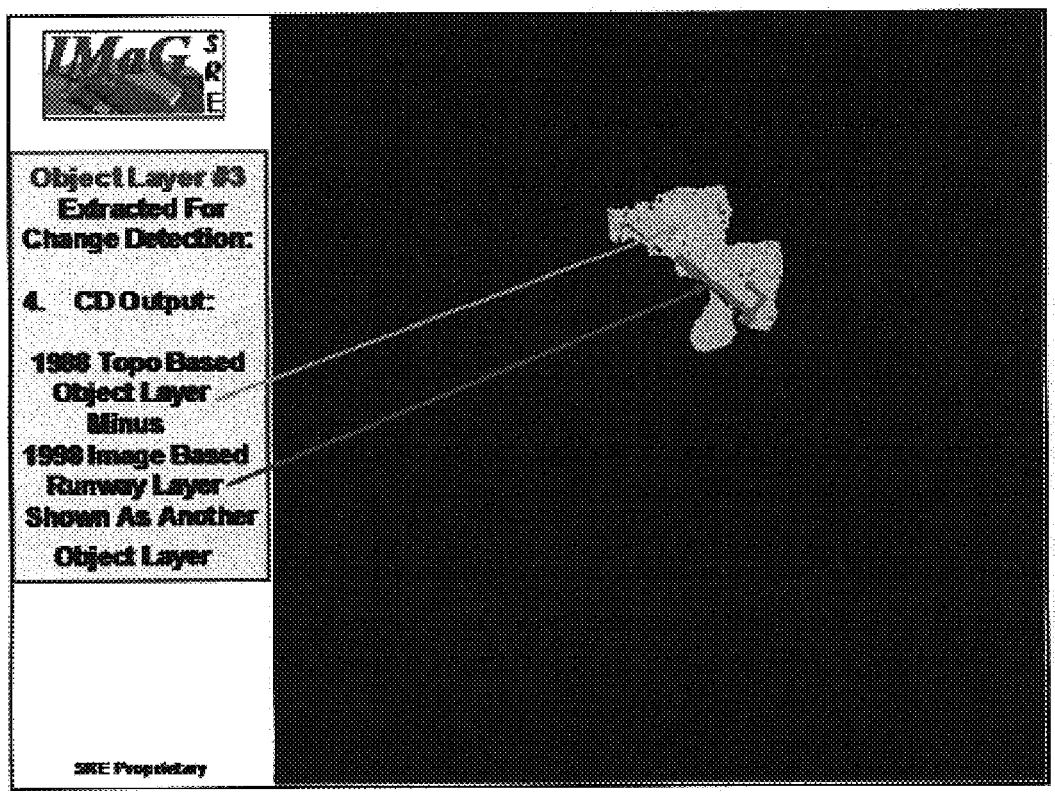
FIG. 11 shows a change in the runway feature of FIG. 10 between historic data and newer data.
Figure 12:
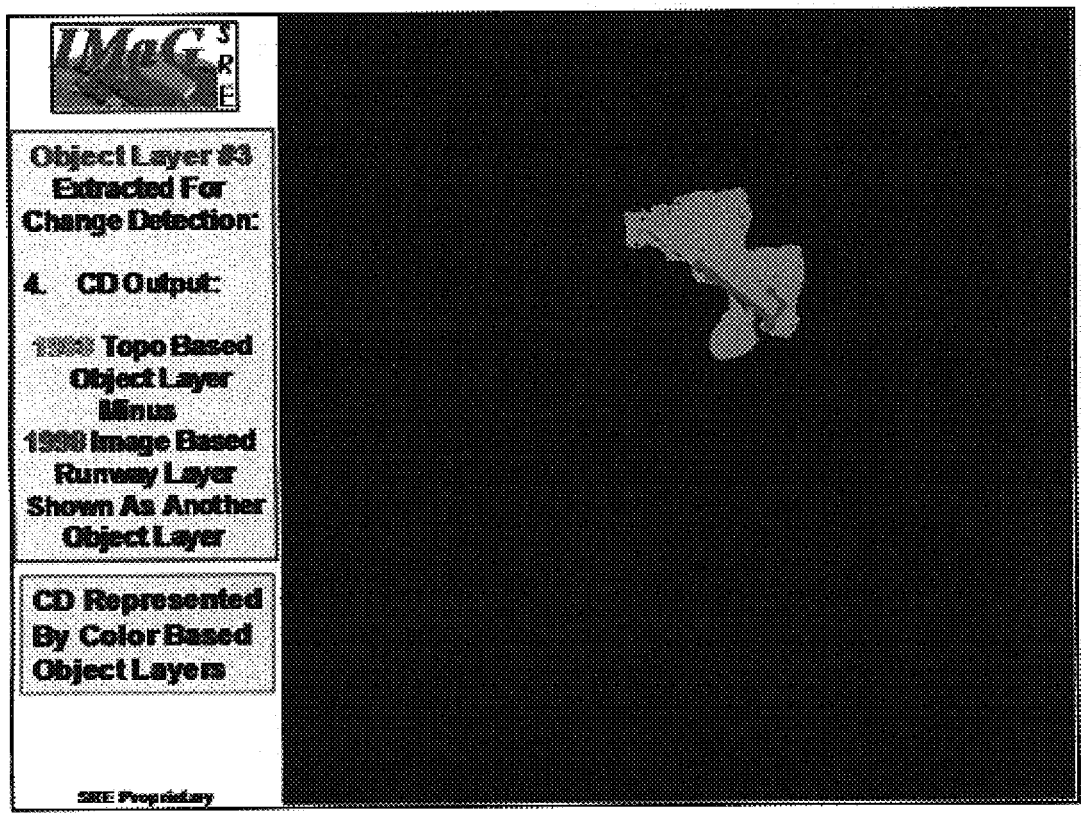
FIG. 12 shows the changes of FIG. 11 derived from data fusion.

In FIG. 4, columns 4 and 5, reference numbers 302, 304, respectively, are row center and column center of an extracted region. They are similar to elements of a boundary, and thus can be easily converted to corresponding geocoordinates.

In general, signals cannot be portrayed as an image. However, the locations where the signals are obtained can be represented as a point object in an image in both the image and geospatial domains as shown in FIG. 4.

With the IMaG system, a user processes data and information using words and concepts. Thus, with IMaG, the user can generate new objects by fusing existing objects according to their spatial relationships. Object change detection (i.e., the change in a identified object over time) is such an example as illustrated in FIGS. 6-12.

All the objects in the VGIS cell discussed above can be represented for both information processing and visualization purposes. For data processing, the object layer is represented by 8-bit pixels, whereas as for visualization, the object is represented by a solid color or translucent color overlaid on a background scene, which can be either gray-tone images or color images.

Figure 2:
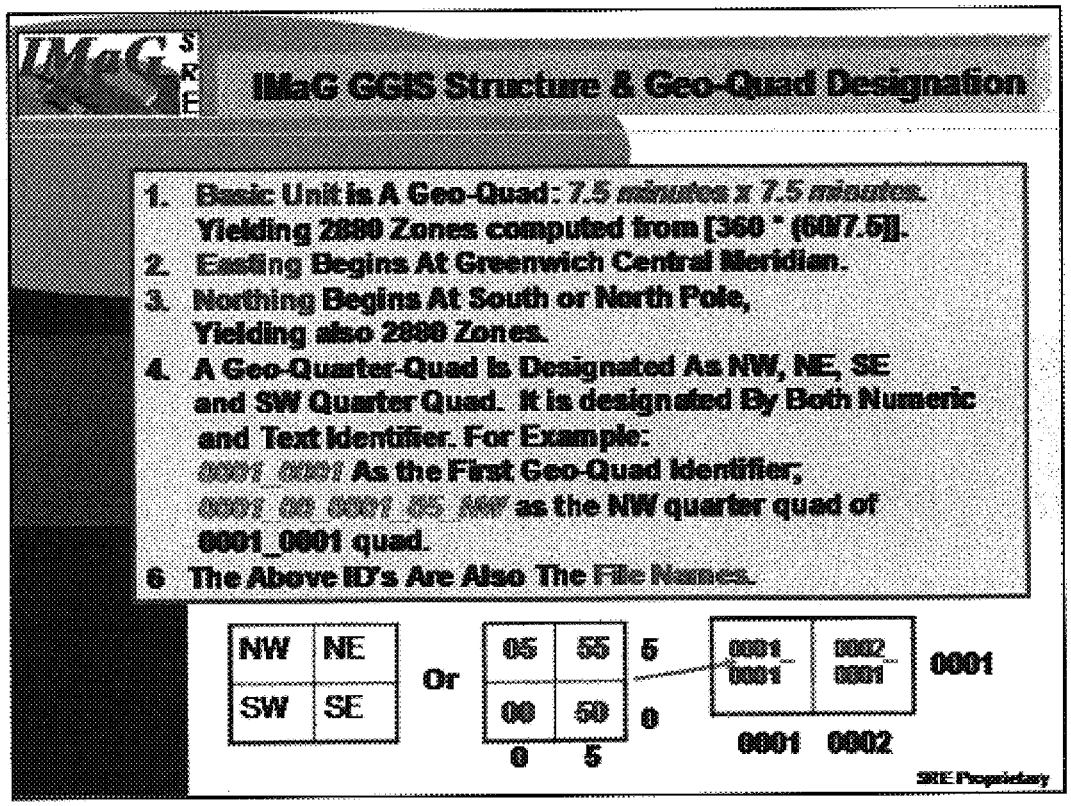
FIG. 2 is a key that identifies an addressing schema for DOQQs.

With the global or virtual geoquad structure of the present invention as shown in FIG. 2, all the objects become the elements of a virtual geoquad-based object library. By using the geoquad ID as a subset of an object name, such as 0001_0001 as the prefix, all the posted objects within that geoquad are readily available to the user(s). For example, if the specific objects in a geoquad are posted with four feature layers (e.g., water, vegetation, roads, and buildings), the object file names might be:

TABLE 1

File Names in Geoquad 0001_0001

Figure 13:
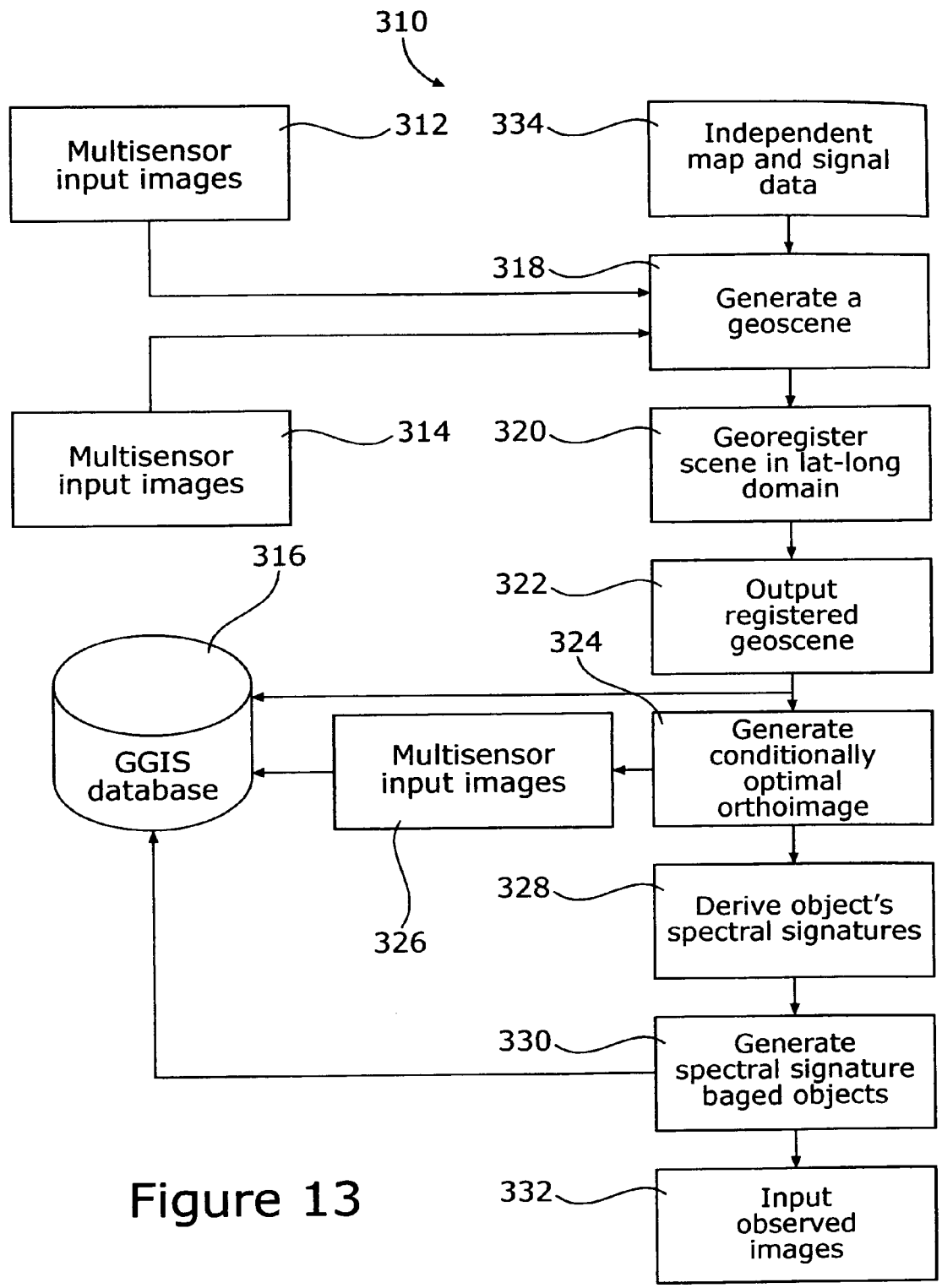
FIG. 13 is a flowchart showing the steps of the method of the invention.

0001_0001_water.pgm
0001_0001_vegetation.pgm
0001_0001_roads.pgm
0001_0001_buildings.pgm Referring now to FIG. 13, there is shown a flow chart of the method of the present invention, generally at reference number 310. One or more multisensor input images 312, along with a reference multisensor image, typically from VGIS database 316, are used to generate a geoscene, step 318. Typically, multisensor input image 314 serves as the base image and is an ortho or near-ortho image that has a higher resolution than do the image(s) represented by multisensor images 312. Thus, the base reference image 314 is referred to as a conditionally optimal base image (COBI). Multisensor images 312 are registered to the COBI 314 on two or more ground control points (GCP). The GCPs in COBI 314 are assumed to have accurate lat-long readings (i.e., geocoordinates).

Georegistration in the lat-long domain is next performed, step 320. If the resolution of the to-be-registered image is very low, multiple stages of georegistration may be required.

The registered geoscenes are output as an image cube, step 322. The characteristics of the registered geoscenes are given in a header. Information contained in the header includes such information as: resolution in both x-axis and y-axis, orientation along which longitude (central meridian), north offset, whether UTM or VTM was used, etc. This image cube is in and of itself a useful end product of the inventive method. The registered geoscense are stored in database 316 as well as made available for additional processing.

The registered geoscenes generated in step 322 may be converted to conditional optional orthoimages, step 324. However, in order to do this, image 314 (i.e., the COBI) must be an orthoimage. These orthoimages and their n-transforms constitute yet another useful output product of the inventive method.

Both raster and vector images may be generated from the orthoimages, step 326. These dual raster/vector images also may be stored in the VGIS database 316.

The orthoimages generated in step 324 may be further processed to derive spectral signatures therefrom, step 328. These spectral signatures form at least a portion of a spectral signature library. As with several aforementioned outputs of the inventive process, the spectral signatures/spectral signature library are also useful outputs and also may be stored in VGIS database 316.

Spectral signature based objects may be formed, step 330, from either observed, georegistered scenes 332, plus their n-transforms and used as elements for matching against a spectral signature library.

Since other modifications and changes varied to fit particular operating requirements and environments will be apparent to those skilled in the art, the invention is not considered limited to examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of generating a virtual geospatial information system (VGIS) database, the steps comprising:
 a) inputting at least two images, one of said images being a base image for georegistration;
 b) generating at least one geoscene using at least two ground control points in a lat-long geospatial domain;
 c) performing georegistration of said at least one geoscene in said lat-long geospatial domain to produce a registered geoimage; and
 d) outputting a geoimage;
whereby a pixel in said at least one geoscene is represented by:
 i) (x,y) coordinates in the image domain;
 ii) (z) coordinate in the spectral and elevation/height domains;
 iii) UTM representation in the geospatial domain;
 iv) latitude/longitude in the geospatial domain; and
 v) Virtual Transverse Mercator.

2. The method of generating a VGIS database as recited in claim 1, wherein said base image comprises a conditionally optimal base image (COBI).

3. The method of generating a VGIS database as recited in claim 2, wherein said COBI comprises an ortho-rectified image.

4. The method of generating a VGIS database as recited in claim 1, wherein said generating step (b) comprises using at least one of a UTM and a VTM projection.

5. The method of generating a VGIS database as recited in claim 1, wherein said generating step (b) comprises performing an Affine transform for coordinate transformation.

6. The method of generating a VGIS database as recited in claim 1, wherein said performing georegistration step (c) comprises locating at least one of: the intersection, and the union of pixels in said at least two input images, said intersected and said unioned pixels defining a main body of said registered geoimage.

7. The method of generating a VGIS database as recited in claim 6, wherein pixels other than pixels of said main body are background pixels.

8. The method of generating a VGIS database as recited in claim 1, wherein said performing georegistration step (c) comprises at least one of the processes: geogridding, geooverlaying, and geomasking.

9. The method of generating a VGIS database as recited in claim 1, wherein said georegistration step (c) is performed in at least two stages.

10. The method of generating a VGIS database as recited in claim 1, wherein said geoimage of said outputting step (d) comprises at least one of: a non-georegistered image, a registered geoimage, a geomosaic, a geogridded geoimage, a geooverlayed geoscene, and a geomasked geoscene.

11. The method of generating a VGIS database as recited in claim 10, wherein a geogrid associated with said geogridded geoimage comprises text.

12. The method of generating a VGIS database as recited in claim 1, wherein said registered geoimage comprises geoscene characteristic information.

13. The method of generating a VGIS database as recited in claim 12, wherein said geoscene characteristic information comprises at least one of: a scene dimension, pixel resolution in at least one of an x-scale and a y-scale, the central meridian, the geoscene used, degrees of offset from the north, degrees of offset from the east, a UTM meridian, and a VTM meridian.

14. The method of generating a VGIS database as recited in claim 4, wherein said VTM projection comprises a local central meridian determined from a distribution of geolocations of pixels in at least one of said at least two input images.

15. The method of generating a VGIS database as recited in claim 14, wherein at least one of said generating a geoscene step (b) and said performing georegistration step (c) utilize a VTM system whereby said geoscene generation and said georegistration may be performed on an image having pixels on both the north side and the south side of the equator.

16. The method of generating a VGIS database as recited in claim 15, wherein said VTM system comprises means for performing at least one of the functions: geoscene generation, geolocation, georegistration, geomosaicking, geogridding, geooverlaying, and geomasking.

17. The method of generating a VGIS database as recited in claim 1, wherein said outputting step (d) comprises normalizing a registered image such that a background pixel is assigned a tone value of zero and a minimum tone value for said registered image is one.

18. The method of generating a VGIS database as recited in claim 1, wherein one of said at least two images comprises at least one of: map data, and signal data.

19. The method of generating a VGIS database as recited in claim 18, wherein said map data and signal data are provided by a source independent from a source of others of said at least two images.

20. A method of generating a virtual geospatial information system (VGIS) database, the steps comprising:
    a) defining a virtual geoquad (VGQ) system for uniquely identifying geographic regions comprising 7.5 minutes latitude by 7.5 minutes longitude;
    b) assigning an identification code to each VGQ;
    c) inputting at least two images, one of said images being a base image for georegistration;
    d) generating at least one geoscene using at least two ground control points in a lat-long geospatial domain;
    e) using said unique identification code, performing georegistration of said at least one geoscene in said lat-long geospatial domain to produce a registered geoimage; and
    f) outputting a geoimage;
whereby a pixel in said at least one geoscene is represented by:
    i) (x,y) coordinates in the image domain;
    ii) (z) coordinate in the spectral and elevation/height domains;
    iii) UTM representation in the geospatial domain;
    iv) latitude/longitude in the geospatial domain; and
    v) Virtual Transverse Mercator.

21. The method of generating a VGIS database as recited in claim 20, wherein a VGQ defined in said defining a VGQ system step (a) comprises a VGQ having origins defined at least one of: the equator, and the Greenwich Central Meridian.

22. The method of generating a VGIS database as recited in claim 21, wherein said VGQ is identified by a numeric code, a value of 0001_0001 defining a first possible VGQ and 2880_2880 defining a last VGQ.

23. The method of generating a VGIS database as recited in claim 21, wherein each of said VGQs is divided into four geoquarterquads, each of said geoquarterquads being identified by at least one of: a numeric designation, and a textual designation, and a combination alpha-numeric designation.

24. The method of generating a VGIS database as recited in claim 21, wherein said generating step (d) comprises the sub-step of identifying all of said input images belonging to a particular one of said geoquads.

25. The method of generating a VGIS database as recited in claim 20, wherein said performing georegistration step (e) comprises locating at least one of: the intersection, and the union of pixels in said at least two input images, said intersected and said unioned pixels defining a main body of said registered geoimage, wherein pixels other than said pixels of said main body being background pixels.

26. The method of generating a VGIS database as recited in claim 20, wherein said georegistration step (e) is performed in at least two stages.

27. The method of generating a VGIS database as recited in claim 20, wherein said registered geoimage comprises geoscene characteristic information.

28. The method of generating a VGIS database as recited in claim 27, wherein said geoscene characteristic information comprises at least one of: a scene dimension, pixel resolution in at least one of an x-scale and a y-scale, the central meridian, the geoscene used, degrees of offset from the north, degrees of offset from the east, a UTM meridian, and a VTM meridian.

29. The method of generating a VGIS database as recited in claim 23, wherein said VTM projection comprises a local central meridian determined from a distribution of geolocations of pixels in at least one of said at least two input images.

30. The method of generating a VGIS database as recited in claim 23, wherein at least one of said generating a geoscene step (d) and said performing georegistration step (e) utilize a VTM system whereby said geoscene generation and said georegistration may be performed on an image having pixels on both the north side and the south side of the equator.

31. The method of generating a VGIS database as recited in claim 30, wherein said outputting step (f) comprises normalizing a registered image such that a background pixel is assigned a tone value of zero and a minimum tone value for said registered image is one.

32. The method of generating a VGIS database as recited in claim 20, wherein one of said at least two images comprises at least one of: map data, and signal data.

33. The method of generating a VGIS database as recited in claim 32, wherein said map data and signal data are provided by a source independent from a source of others of said at least two images.

34. A method of generating a virtual geospatial information system (VGIS) database, the steps comprising:
 a) defining a Virtual Transverse Mercator (VTM) projection;
 b) inputting at least two images, one of said images being a base image for georegistration;
 c) generating at least one geoscene using at least two ground control points in a lat-long geospatial domain defined using at least one of said VTM projection and a Universal Transverse Mercator (UTM) projection;
 d) using at least one of said VTM and UTM projections, performing at least one of the functions: geoscene generation, georegistration, geolocation, geomosaicking, geooverlaying, geogridding, and geomasking of said at least one geoscene in said lat-long geospatial domain to produce a registered geoimage; and
 e) outputting a geoimage;
whereby a pixel in said at least one geoscene is represented by:
 i) (x,y) coordinates in the image domain;
 ii) (z) coordinate in the spectral and elevation/height domains;
 iii) UTM representation in the geospatial domain;
 iv) Latitude/longitude in the geospatial domain; and
 v) Virtual Transverse Mercator.

35. The method of generating a VGIS database as recited in claim 34, wherein in at least one of said generating a geoscene step (c) and said georegistering step (d), only said UTM projection is used when all pixels in all of said at least two images fall on a single side of the equator and fall within a single UTM zone.

36. The method of generating a VGIS database as recited in claim 34, wherein said generating step (c) comprises performing an Affine transform for coordinate transformation.

37. The method of generating a VGIS database as recited in claim 34, wherein said performing georegistration step (d) comprises locating at least one of: intersecting, unioning, geogridding, geooverlaying, and geomasking of pixels in said at least two input images to define a main body of said registered geoimage.

38. The method of generating a VGIS database as recited in claim 37, wherein pixels other than pixels of said main body are background pixels.

39. The method of generating a VGIS database as recited in claim 34, wherein said georegistration step (d) is performed in at least two stages using at least one of said UTM and said VTM projections.

40. The method of generating a VGIS database as recited in claim 34, wherein said geoimage of said outputting step (d) comprises at least one of: a non-georegistered image, a registered geoimage, a geomosaic, a geogridded geoimage, a geooverlayed geoscene, and a geomasked geoscene.

41. The method of generating a VGIS database as recited in claim 34, wherein said registered geoimage comprises geoscene characteristic information defined in at least one of said UTM and said VTM projections.

42. The method of generating a VGIS database as recited in claim 41, wherein said geoscene characteristic information comprises at least one of: a scene dimension, pixel resolution in at least one of an x-scale and a y-scale, the central meridian, the geoscene used, degrees of offset from the north, degrees of offset from the east, a geogrid, and geotext for at least one of said UTM and said VTM projections, a UTM meridian, a VTM meridian.

43. The method of generating a VGIS database as recited in claim 34, wherein said VTM projection comprises a local central meridian determined from a distribution of geolocations of pixels in at least one of said at least two input images.

44. The method of generating a VGIS database as recited in claim 34, wherein at least one of said generating a geoscene step (c) and said performing georegistration step (d) utilize a VTM system whereby said functions of geoscene generation, georegistration, geolocation, geomosaicking, geooverlaying, geogridding, and geomasking geoscene generation and georegistration may be performed on an image having pixels on both the north side and the south side of the equator.

45. The method of generating a VGIS database as recited in claim 34, wherein said outputting step (e) comprises normalizing a registered image such that a background pixel is assigned a tone value of zero and a minimum tone value for said registered image is one.

46. The method of generating a VGIS database as recited in claim 34, wherein one of said at least two images comprises at least one of: map data, and signal data in at least one of said UTM and said VTM projections.

47. The method of generating a VGIS database as recited in claim 34, wherein said map data and signal data are provided by a source independent from a source of others of said at least two images.

* * * * *